United States Patent
Garnavi et al.

(10) Patent No.: US 10,049,286 B2
(45) Date of Patent: Aug. 14, 2018

(54) IMAGE-BASED RISK ESTIMATION

(71) Applicant: International Business Machines Corporation, Armonk, NY (US)

(72) Inventors: Rahil Garnavi, East Ivanhoe (AU); Timothy M. Lynar, Melbourne (AU); Suman Sedai, Hughesdale (AU); John M. Wagner, Plainville, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

(21) Appl. No.: 14/969,619

(22) Filed: Dec. 15, 2015

(65) Prior Publication Data
US 2017/0169369 A1    Jun. 15, 2017

(51) Int. Cl.
*G06K 9/00* (2006.01)
*G06Q 10/06* (2012.01)
(Continued)

(52) U.S. Cl.
CPC ..... *G06K 9/00825* (2013.01); *G01C 21/3647* (2013.01); *G05D 1/0027* (2013.01);
(Continued)

(58) Field of Classification Search
CPC .. G06Q 10/0635; G06Q 50/265; G06Q 50/28; G06Q 30/0266; G06F 17/30259; G06F 21/88; G06F 11/3065; G06K 9/3233; G06K 2209/25; G06K 9/00785; G06K 9/00791; G06K 9/00288; G06K 9/00087;
(Continued)

(56) References Cited

U.S. PATENT DOCUMENTS 3,057,422 A * 10/1962 Cunningham et al. .. G01G 7/04
                                                                    177/2
3,705,976 A * 12/1972 Platzman ............... G06Q 30/04
                                                                    235/384
(Continued)

FOREIGN PATENT DOCUMENTS

GB        2500760 A  * 10/2013   ........... G08G 1/0175
WO    2013130546 A1    9/2013

OTHER PUBLICATIONS

Davis et al., "Monitoring the behavior and multi-dimensional movements of Weddell seals using an animal-borne video and data recorder", Mem. Natl Inst. Polar Res., Spec. Issue 58, 2004, pp. 148-154.
(Continued)

*Primary Examiner* — Manav Seth
(74) *Attorney, Agent, or Firm* — Cantor Colburn LLP; Louis Percello

(57) ABSTRACT

A method, system, and computer program product to perform image-based estimation of a risk of a vehicle having a specified status include receiving images from one or more cameras, obtaining one or more vehicle images of the vehicle from the image, classifying the vehicle based on the one or more vehicle images to determine a vehicle classification, extracting features from the one or more vehicle images based on the vehicle classification, and comparing the features with risk indicators to determine estimation of the risk. Instructions are provided for an action based on the risk.

20 Claims, 6 Drawing Sheets

(51) Int. Cl.
*G06Q 50/26* (2012.01)
*G06Q 50/28* (2012.01)
*G06F 17/30* (2006.01)
*G06T 7/00* (2017.01)
*G01C 21/36* (2006.01)
*G05D 1/00* (2006.01)
*G06T 7/246* (2017.01)
*G06F 11/30* (2006.01)
*G06K 9/32* (2006.01)

(52) U.S. Cl.
CPC .... *G06F 11/3065* (2013.01); *G06F 17/30259* (2013.01); *G06K 9/00288* (2013.01); *G06K 9/00785* (2013.01); *G06K 9/3233* (2013.01); *G06Q 10/0635* (2013.01); *G06Q 50/265* (2013.01); *G06Q 50/28* (2013.01); *G06T 7/0002* (2013.01); *G06T 7/248* (2017.01); *G06K 2209/25* (2013.01); *G06T 2207/10004* (2013.01); *G06T 2207/30252* (2013.01)

(58) Field of Classification Search
CPC .............. G06K 9/00825; G06T 7/0002; G06T 2207/10104; G06T 2207/30252; G06T 7/20; G06T 7/248; G06T 7/32; G06T 7/74; G06T 2207/30232; G05D 2201/0213; G05D 1/0027; G05D 1/0291; G05D 1/0251; G01C 21/26; G01C 21/3647; G08G 1/0175; G08G 1/166; G08G 1/148; G08G 1/015; G08G 1/017; G08B 13/19613
See application file for complete search history.

(56) References Cited

U.S. PATENT DOCUMENTS

| | | | | |
|---|---|---|---|---|
| 5,088,569 | A | | 2/1992 | Checcucci |
| 5,568,406 | A | * | 10/1996 | Gerber ................ B60R 13/10 116/63 R |
| 6,140,941 | A | * | 10/2000 | Dwyer ................ G07B 15/063 235/384 |
| 6,198,987 | B1 | * | 3/2001 | Park ................ G07B 15/063 340/928 |
| 6,359,238 | B1 | | 3/2002 | Ursu |
| 6,781,523 | B2 | * | 8/2004 | Matsui ................ G07B 15/063 340/910 |
| 6,972,693 | B2 | * | 12/2005 | Brown ................ G01V 5/0008 250/358.1 |
| 7,103,614 | B1 | * | 9/2006 | Kucik ................ G08G 1/017 340/933 |
| 7,412,078 | B2 | * | 8/2008 | Kim ................ G08G 1/054 382/105 |
| 7,471,189 | B2 | * | 12/2008 | Vastad ................ G07B 15/04 340/426.1 |
| 7,483,510 | B2 | * | 1/2009 | Carver ................ G01N 23/04 378/197 |
| 7,990,270 | B2 | * | 8/2011 | Mostov ................ G06Q 10/08 340/500 |
| 8,188,861 | B2 | * | 5/2012 | Pederson ........... G07C 9/00158 340/540 |
| 8,330,599 | B2 | * | 12/2012 | Pederson ........... G07C 9/00158 340/540 |
| 8,379,926 | B2 | * | 2/2013 | Kanhere ............ G08G 1/0175 340/907 |
| 9,030,321 | B2 | * | 5/2015 | Breed ................ B60T 1/005 340/539.17 |
| 9,064,414 | B2 | * | 6/2015 | Nerayoff ............. H04N 7/181 |
| 9,165,375 | B2 | * | 10/2015 | Datta ................ G06T 7/292 |
| 9,396,403 | B2 | * | 7/2016 | Karkowski ........... G06K 9/325 |
| 9,412,142 | B2 | * | 8/2016 | Pederson ........... G08B 13/19647 |
| 9,558,413 | B2 | * | 1/2017 | Ferguson ........... G06K 9/00791 |
| 9,761,135 | B2 | * | 9/2017 | Chen ................ G08G 1/0175 |
| 2005/0073436 | A1 | * | 4/2005 | Negreiro ............ G08G 1/017 340/937 |
| 2014/0270383 | A1 | * | 9/2014 | Pederson ......... G08B 13/19647 382/104 |
| 2014/0337066 | A1 | * | 11/2014 | Kephart ............ G06K 9/00771 705/5 |
| 2015/0294174 | A1 | * | 10/2015 | Karkowski ........... G06K 9/325 382/182 |
| 2015/0356357 | A1 | * | 12/2015 | McManus .......... G06K 9/00791 382/104 |
| 2017/0161572 | A1 | * | 6/2017 | Zhao ................ B60W 40/06 |

OTHER PUBLICATIONS

Favreau et al., "Animal Gaits from Video", Research Report RR-5170, 2004, pp. 1-25.
Noldus et al., "Computerised video tracking, movement analysis and behaviour recognition in insects", Computers and Electronics in Agriculture, vol. 35, 2002, pp. 201-227.
Wierzba et al., "Polarimetric sensors for weigh-in motion of road vehicles", Opto-Electronics Review, vol. 8, No. 2, 2000, pp. 181-187.

* cited by examiner

IMAGE-BASED RISK ESTIMATION

BACKGROUND

The present invention relates to visual analytics, and more specifically, to image-based risk estimation.

Around the world, personal and commercial vehicles represent both convenience and efficiency. The vehicles and the vast system of roadways that facilitate their use have resulted in increased access not only in travel but in the delivery of goods and services. In addition to the increased convenience, traffic on roadways and highways is also associated with increased hazards and costs. The greater the number of drivers who take advantage of the conveniences of driving themselves or their goods over long distances, the greater the chances of accidents and damage to roads. Certain types of drivers or vehicles may increase the risks to safety or road conditions. For example, vehicle weight may contribute to both safety and road maintenance issues. Vehicles over a certain weight may negatively affect the design life expectancy of roads and bridges and even cause bridge collapse in extreme cases, for example. As a result, vehicles (e.g., large commercial trucks) may be required to have their weight inspected at weigh stations along the highways to ensure that a maximum weight is not exceeded (the vehicle is not overweight).

SUMMARY

Embodiments include a method, system, and computer program product for performing image-based estimation of a risk of a vehicle having a specified status. Aspects include receiving, using a processor, images from one or more cameras; obtaining one or more vehicle images of the vehicle from the image; classifying the vehicle based on the one or more vehicle images to determine a vehicle classification; extracting features from the one or more vehicle images based on the vehicle classification; comparing the features with risk indicators to determine estimation of the risk; and providing, using the processor, instructions for an action based on the risk.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, vehicles that represent convenience and efficiency can also represent potential hazards to safety and road conditions. One example is overweight vehicles. These vehicles may be weighed to ensure that the risk they impose is minimized. However, diverting commercial vehicles to weigh stations along the highways can be time consuming and costly. Embodiments of the systems and methods detailed herein relate to automatically identifying vehicles and the risk level they represent. For explanatory purposes, the example of automatically identifying vehicles at risk of being overweight is detailed. However, vehicles associated with other risks (e.g., stolen or unregistered vehicle, vehicle that failed an inspection) may also be automatically identified according to alternate embodiments to those detailed below.

Figure 1:
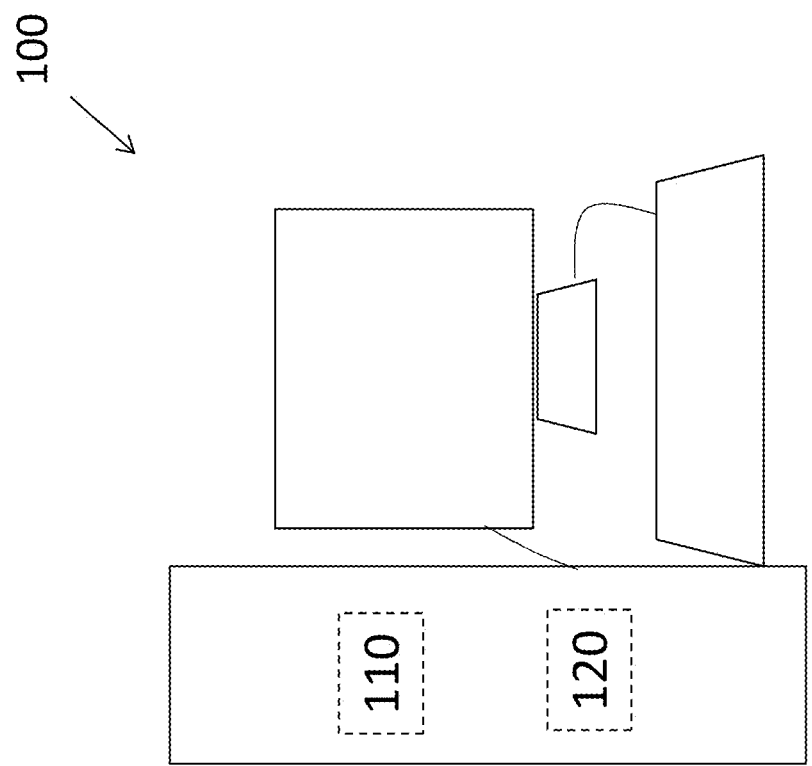
FIG. 1 is a block diagram of an exemplary processing system according to embodiments.

FIG. 1 is a block diagram of an exemplary processing system 100 according to embodiments of the invention. The processing system 100 includes one or more memory devices 110 and one or more processors 120. The processing system 100 includes additional known components that perform functions such as, for example, an input interface and output interface. The memory device 110 stores instructions implemented by the processor 120. As further discussed below, these instructions include processes used to perform the automatic identification and risk assessment on vehicles. According to the embodiments detailed below, the memory device 110 may additionally store databases accessed by the processor 120 in performing the identification and assessment.

Figure 2:
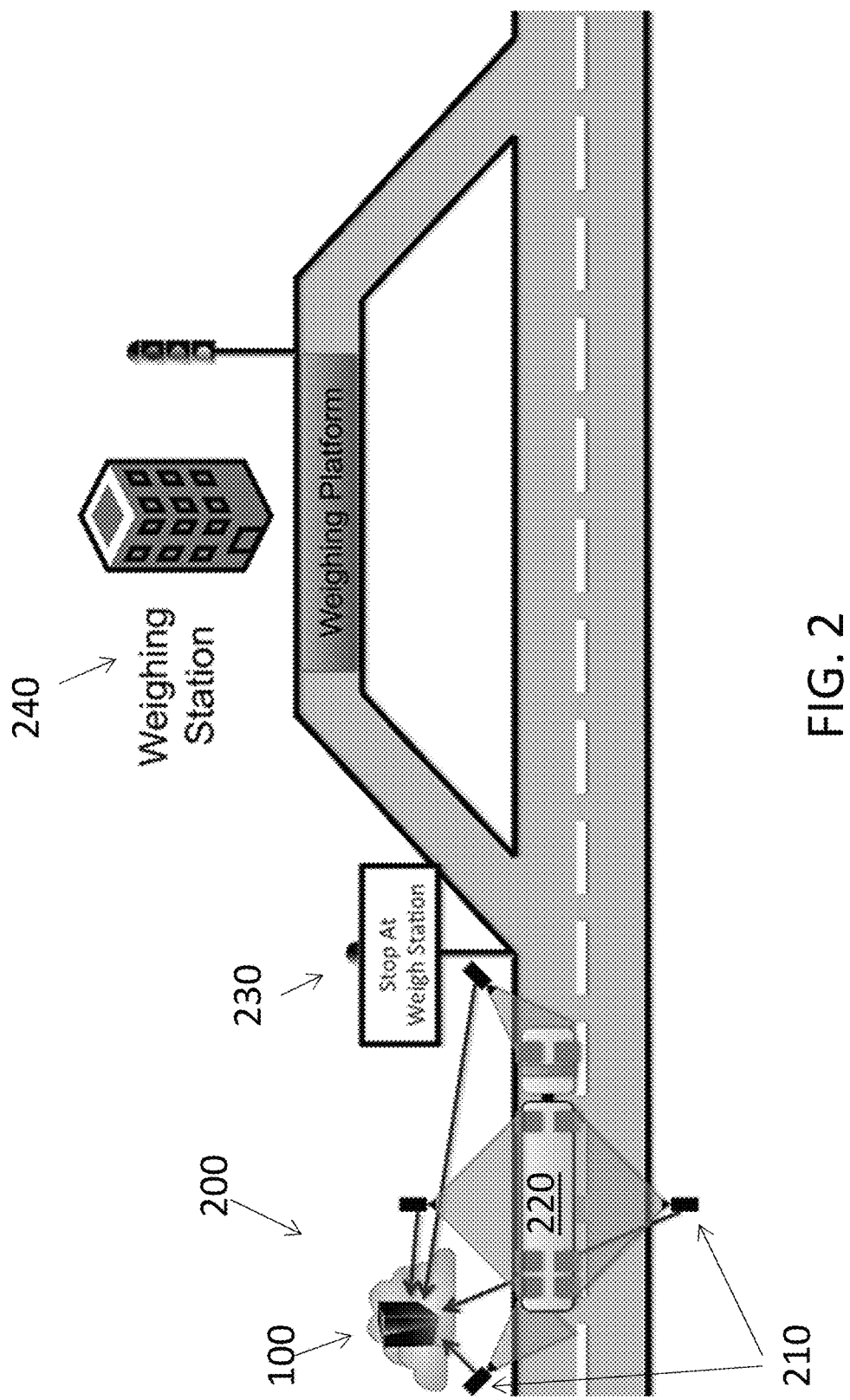
FIG. 2 shows an image-based risk estimation system according to embodiments.

FIG. 2 shows an image-based risk estimation system 200 according to embodiments of the invention. The system 200 includes cameras 210 that provide input to the processing system 100. While the system 200 is shown in one exemplary location that is near a weighing station 240, the system 200 may be movable (e.g., the components may be on portable platforms) such that the system 200 may be deployed in different places as needed. Further, multiple systems 200 deployed in different areas may be interconnected through a central network. The exemplary application illustrated in FIG. 2 is of automatic image-based risk estimation of vehicles that may be overweight. An exemplary vehicle 220 is shown to illustrate the arrangement of the cameras 210 of the system 200. As shown, the cameras 210 are arranged to obtain images from the front, rear, and both sides of the vehicle 220 as the vehicle 220 travels through the camera 210 views. Each of the cameras 210 provides images (video images, still images, or a combination of the two) to the processing system 100. The processing system 100 uses the images to identify a type of the vehicle 220 (e.g., car, van, truck). When the vehicle 220 is identified as a type (e.g., truck) that may be overweight, the processing system 100 extracts features of the vehicle 220 from the images. The features are then compared with stored indicators of risk (stored in one or more memory devices of the processing system 100, for example). If, based on the comparison, the processing system 100 determines that the vehicle 220 exceeds a threshold risk of being overweight, the vehicle 220 may be diverted to the weighing station 240. The vehicle 220 may be provided with a message on a board 230 controlled by the processing system 100, for example, in order to divert the vehicle 220. When the processing system 100 determines a below threshold risk of the vehicle 220 being overweight, the vehicle 220 is not diverted to the weighing station 240, and the time and cost associated with weighing the vehicle 220 are avoided. The processes performed by the processing system 100 are further discussed below.

Figure 3:
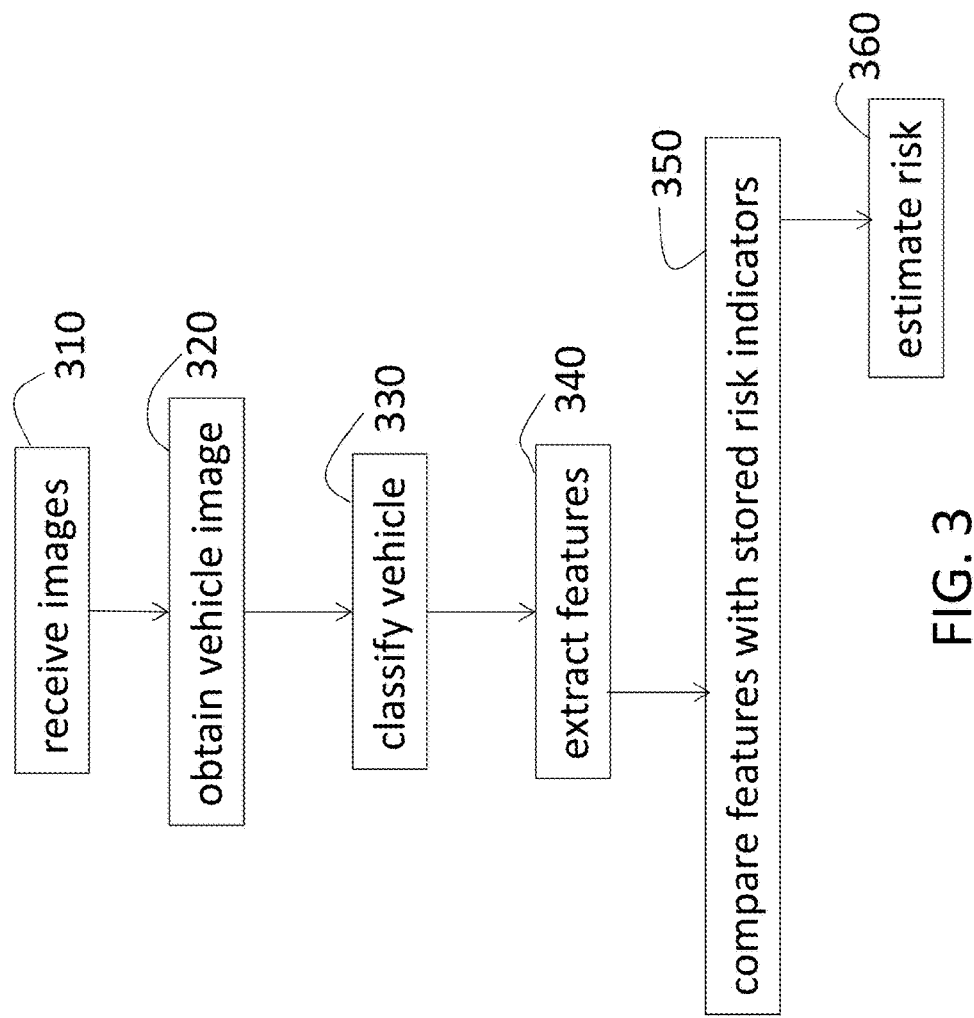
FIG. 3 is a process flow of a method of automatic image-based risk estimation according to embodiments.

FIG. 3 is a process flow of a method of automatic image-based risk estimation according to embodiments. At block 310, receiving images includes the processing system 100 receiving images obtained by the cameras 210. Image may refer to a three-dimensional image generated with the different cameras 210. In alternate embodiments, the cameras 210 may be treated individually and each of their (two-dimensional) images may be separately processed. Initially, without any vehicle 220 in the view of any of the cameras 210, an image (referred to as a background image) is obtained from the cameras 210. Obtaining the vehicle image, at block 320, includes subtracting that background image from each subsequent image received from the cameras 210. The position of the vehicle 220 relative to the cameras 210 that is shown in FIG. 2 provides the information of interest from the vehicle 220. Thus, as the vehicle 220 moves through the field of view of the cameras 210, images may be obtained and the image obtained at the relative positioning shown in FIG. 2 may be retained for further processing according to the embodiment discussed with reference to FIG. 3. As FIG. 2 indicates, at least one of the cameras 210 may obtain an image with more than one vehicle 220. In the illustration of FIG. 2, the camera 210 that is across the road (divided from the vehicle 220 that is shown by another lane) may capture an image of not only the vehicle 220 that is shown, but another vehicle 220 in the adjacent lane. The system 200 may be deployed in an area with multiple lanes, as well. In this case, more sophisticated image processing is needed to isolate the vehicle 220 and ensure that all the images being processed are from the same vehicle 220. According to one exemplary embodiment, multiple images taken with the different cameras 210 at different views are time synchronized to ensure that images taken from all cameras 210 correspond with the same time instance. The foreground region from each view (obtained with each camera 210) is analyzed for the presence of one or more vehicles 220 using a known segmentation algorithm. The segmentation algorithm labels regions corresponding to each vehicle 220 in each image, in case multiple vehicles 220 are present in the view. The features particular to each vehicle 220 are then extracted from the corresponding images obtained with each of the cameras 220 as discussed with reference to block 340.

Once a vehicle image is obtained at block 320, classifying the vehicle 220, at block 330, includes known image processing techniques. The known processing techniques may involve a classification model that is pre-trained using exemplary vehicle images in the form of annotated images, for example. Based on the size, shape, and appearance of the vehicle 220, the classification model may identify the type of the vehicle 220. Thus, the classifying, at block 330, results in the identification of the vehicle 220 as a car or truck, for example. For the exemplary application of estimating the risk of the vehicle 220 being overweight, no further processing would be needed if the classifying, at block 330, determined that the vehicle 220 is a car or van, for example.

At block 340, extracting features refers to extracting features of interest from the vehicle image, and may differ based on the particular application. Exemplary features, which are discussed further with reference to FIGS. 4 and 5, include license plate, truck trailer, number of axles, and damage. Based on the specific application and, thus, the features of interest, the number of cameras 210 needed to capture different views of the vehicle 220 may vary. The exemplary arrangement of cameras 210 shown in FIG. 2, which capture views from every side of a passing vehicle 220, is necessary for the features of interest (e.g., license plate, which is in the back of a vehicle 220, logo, which may be on a side of a vehicle 220) associated with determining the risk that a vehicle 220 is overweight, for example. Other exemplary features may include logos on the outer body or mud flaps of the vehicle 220, color, shape, size, number of wheels, and running lights. Based on the particular application, additional or alternate features may be extracted at block 340. For example, if the image-based risk estimation were used to assess the risk of the vehicle being a stolen vehicle, the only feature of interest may be the license plate. According to an exemplary embodiment, the image region showing a vehicle 220 is analyzed for the presence of the features of interest. This analysis involves searching the image patches at multiple scales by applying a classification model of each feature type. For example, a logo detector could be trained to identify the logos using a database of a set of logos. The damage may be detected using a classifier trained to recognize damaged image regions. Similarly, the axle detector may be trained using a set of axle images. The location of axles with respect to the vehicle 220 and with respect to each other may be used to determine the number of axles in operation. Similarly, the presence of mud flaps on the vehicle 220 may be determined using a mud-flap detector that is pre-trained based on set of mud-flap images.

Comparing the features with stored risk indicators, at block 350, may be based on a database of risk indicators stored in the memory device 110 of the processing system 100, for example. The risk indicators are specific to each application. For example, the risk indicators stored to identify vehicles 220 that may be overweight would differ from the risk indicators stored to identify vehicles 220 that may be stolen. For the overweight vehicle application, the risk indicators may include logos associated with companies that have historically been found to deploy overweight trucks, for example. Specific license plates may be stored as risk indicators, as well. As these examples indicate, the database of risk indicators may be updated, as needed, to add or modify risk indicators. In this regard, the system 200 may be connected to a centralized database of risk indicator information. That is, as noted above, while the system 200 may be deployed in one area, other systems 200 that are deployed in different areas may provide information regarding overweight vehicles 220 that is used to update the risk indicator databased of each system 200. Alternately, each system 200 may rely solely on a centralized database of risk indicators rather than storing and updating a local copy at all. While some of the exemplary risk indicators (e.g., license plate, logo) may be based on an identity of the vehicle 220, others may be based on the condition of the vehicle 220. Damage, based on the location and extent, may be an indication of a risk that the vehicle 220 is overweight. That is, vehicles 220 that are damaged may be more likely to carry a load over the limit (according to relevant guidelines) for the type of the vehicle 220. Examples of vehicle damage (extracted as features at block 340) include dents, structural damage, broken lights, or any other damage that might be indicative of poor operating standards or vehicle neglect. In case of damage (as the extracted feature at block 340), the detected damaged part may be evaluated by a regression function (pre-trained) that predicts the severity of the damage. The severity score could range from 0-10, where 0 indicates no damage and 10 indicates extremely damaged, for example. The severity score of all the damage to the vehicle 220 may be aggregated to obtain the final damage severity score of the vehicle 220. According to an embodiment, the feature corresponding to the vehicle damage is the severity score of the damage. In alternate embodiments, a different severity score may be computed for individual locations such as front, side, back of the vehicle 220 rather than for the whole vehicle 220. Historical data may be used to correlate damage (severity score) with a risk indicator score. The number of axles, extracted as a feature (at block 340), may be compared with a number (for the given type of the vehicle 220) that suggests that the vehicle 220 may be carrying a heavy load. As discussed above, the axle configuration of a vehicle 220 may be determined using a trained axle detector. Exemplary axle configurations include a single axle (adjacent axles are more than 16 feet from center to center) and short tandem (adjacent axles are within 4 feet of each other). Guidelines issued at the state or federal level, for example, indicate the maximum allowable weight for a given axel configuration. Historical data may be used to correlate the axle configuration with a risk indicator.

Figure 4:
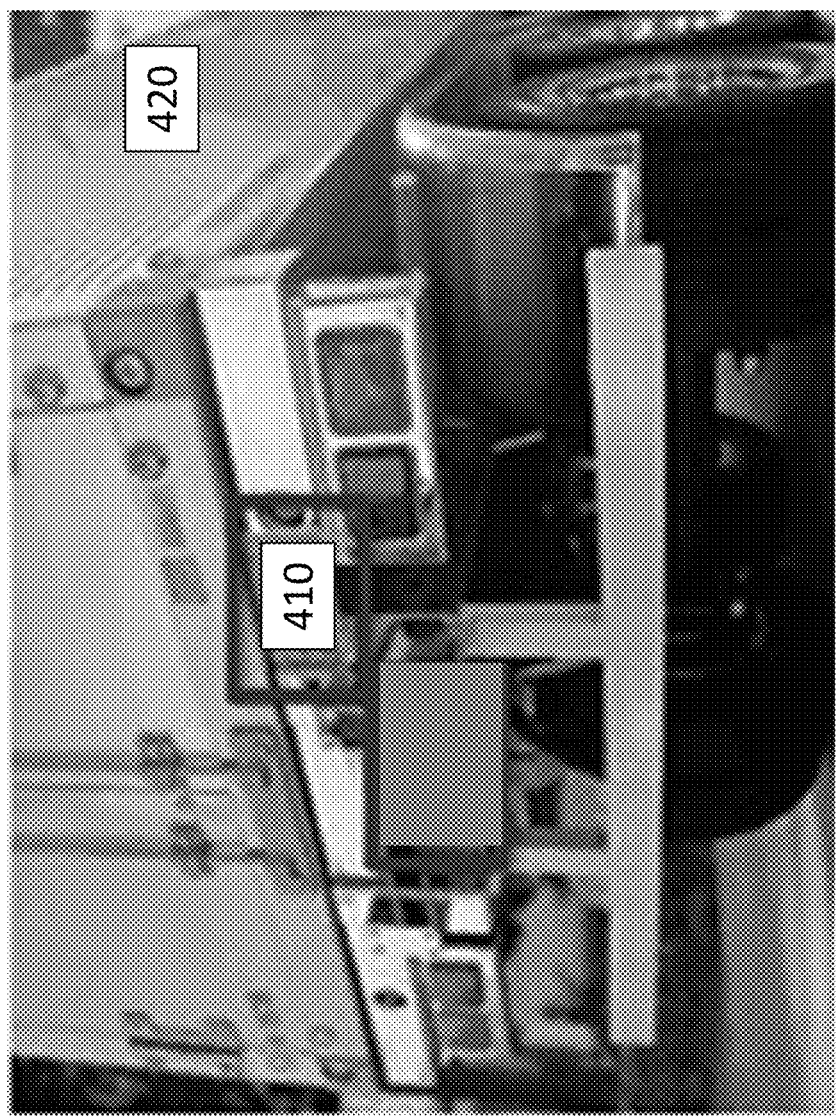
FIG. 4 is an exemplary image obtained with one of the cameras of the system according to embodiments.
Figure 5:
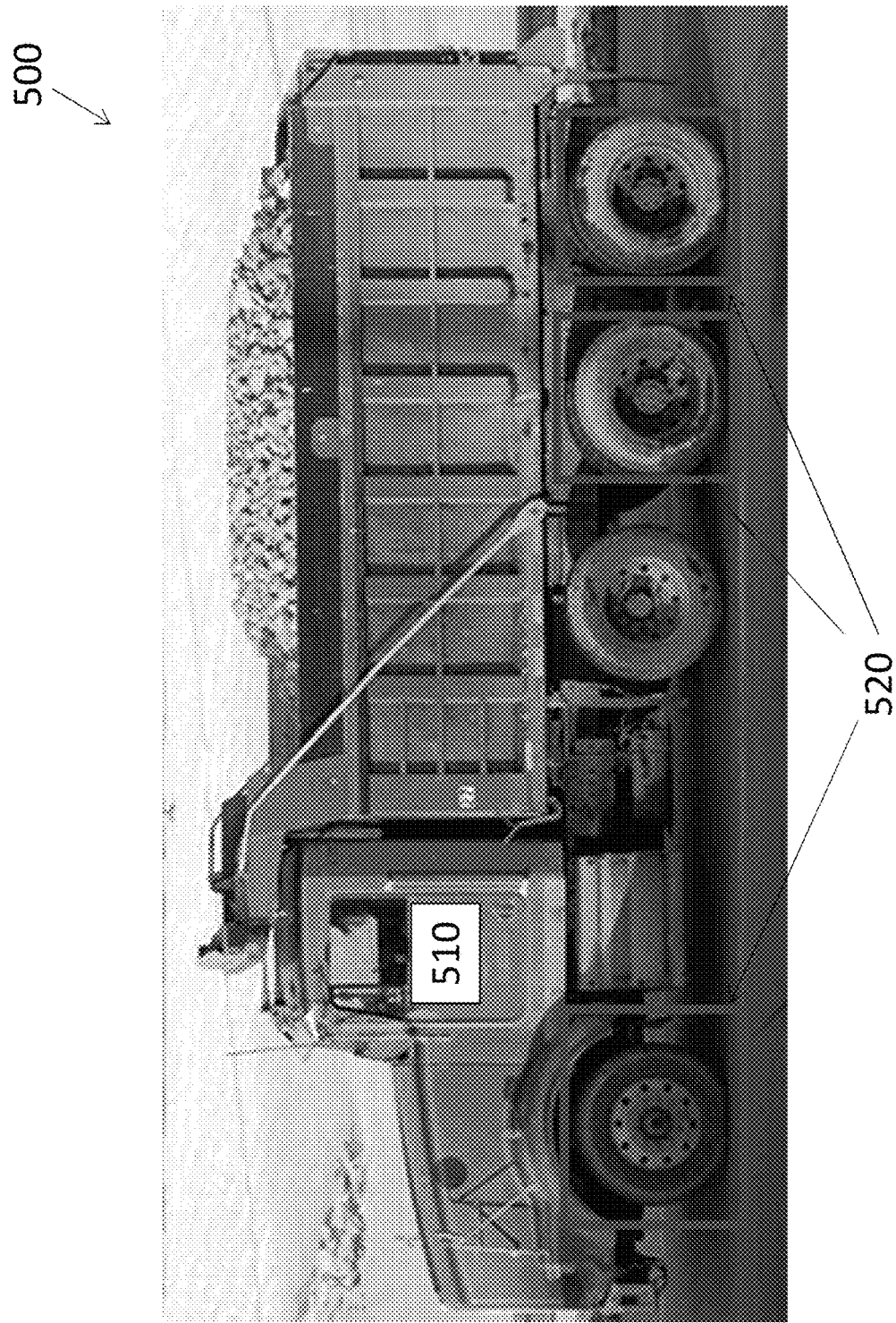
FIG. 5 is an exemplary image obtained with one of the cameras of the system according to embodiments.

To be clear, it may not be possible to extract every feature of interest, because every feature of interest may not be visible in the images obtained for a given vehicle 220. For example, in the arrangement shown in FIG. 2, if two vehicles 220 pass each other within the view of the cameras 210, then one side of each vehicle 220 will be obscured from a camera 220 by the other. According to exemplary embodiments, a weighting may be used on features of interest that were successfully extracted to ensure that a small number of extracted features do not skew the risk estimation. This weighting may be based on the feature itself or on the number of features extracted, for example. Once the comparison of extracted features (extracted at block 340) with stored risk indicators is completed (at block 350), estimating risk, at block 360, includes quantifying the comparison. A score may be assigned for each comparison done at block 350, for example, and the scores obtained for all the comparisons may be averaged or aggregated. This average or aggregate score may then be used to determine an action as further discussed with reference to FIG. 6 below. FIGS. 4 and 5 illustrate exemplary extracted features.

FIG. 4 is an exemplary image 400 obtained with one of the cameras 210 of the system 200 according to embodiments. The image 400 is obtained with a camera 210 focused on the rear of the vehicle 220. Extracting features (at block 340) from the image 400 results in extracting the license plate 410. Damage 420 on the side of the vehicle 220 that is visible from the same viewing angle that captures the license plate 410 may also be extracted (at block 340). This damage 420 would also be extracted from the image obtained by the camera 210 focused on the side of the vehicle 220. Thus, features extracted from images obtained by more than one camera 210 may be combined or may be treated separately according to alternate embodiments. According to an exemplary embodiment, features extracted from different camera views corresponding to the same vehicle 220 are aggregated.

FIG. 5 is an exemplary image 500 obtained with one of the cameras 210 of the system 200 according to embodiments. The image 500 is obtained with a camera 210 focused on the side of the vehicle 220. Extracting features (at block 340) from the image 500 results in extracting a logo 510 on the driver door. The number of axles 520 of the truck shown in the image 500 could be estimated as a feature, as well. The number of wheels may also be estimated from the image 500. As noted above, a trained axle detector may give the location of the axles in the image of a vehicle 220. The location of the detected axles with respect to the vehicle 220 and with respect to each other may be used to determine the number of axles in operation. A side view of the vehicle 220 is needed to determine the number of axles. Thus, when the axles are not visible, for example, when the vehicle 220 is occluded by another vehicle 220 in the side image, then other features that are visible are used for risk estimation.

Figure 6:
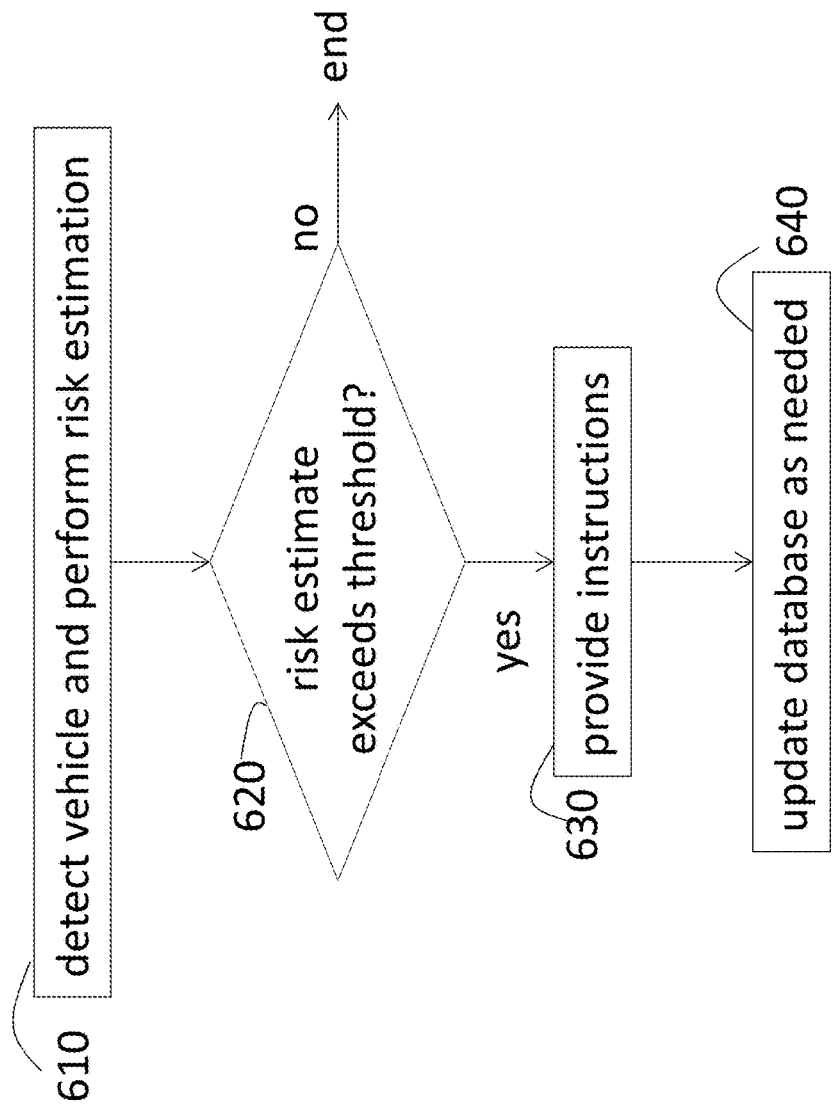
FIG. 6 is a process flow of a method of identifying and instructing overweight vehicles based on image-based risk estimation according to embodiments.

FIG. 6 is a process flow of a method of identifying and instructing overweight vehicles based on image-based risk estimation according to embodiments. As noted above, this example—of managing potentially overweight vehicles based on risk assessment—is only one application of the processes discussed with reference to FIG. 4. By modifying the specific features that are extracted and the specific risk indicators that are considered, other applications are contemplated using the embodiments detailed herein. At block 610, detecting the vehicle 220 and performing risk estimation refers to performing the processes shown in FIG. 3 with the extracted features (at block 340) and the risk indicators (for block 350) being specifically selected to estimate the risk of an overweight vehicle. As noted with reference to block 360, a quantitative risk estimate is obtained. Determining whether or not that risk estimate exceeds a predetermined threshold, at block 620, determines if the processes need to continue. That is, if the estimated risk does not exceed the predetermined threshold, then nothing further needs to be done for the given vehicle 220.

If the estimated risk does exceed the threshold, then providing instructions, at block 630, may include providing a message on the board 230 or otherwise communicating with the vehicle 220 to indicate that it must divert to a weighing station 240. Updating the database as needed, at block 640, includes obtaining the weight of the vehicle 220 that was diverted to the weighing station 240. If the vehicle 220 was, in fact, determined to be overweight, then that information would indicate that the risk indicators were correct. If, on the other hand, the vehicle 220 was found not to be overweight at the weighing station 240, then that information may be used to adjust the threshold (at block 620) or to adjust the scores assigned to risk indicators that match features (at block 350), for example. The processes shown in FIG. 6 could be adjusted to use the image-based risk estimation for other purposes (e.g., to identify a stolen or unregistered vehicle).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of performing image-based estimation of a risk of a vehicle having a specified status, the method comprising:
   receiving, using a processor, images from one or more cameras;
   obtaining one or more vehicle images of the vehicle from the image;
   classifying the vehicle based on the one or more vehicle images to determine a vehicle classification;
   extracting features from the one or more vehicle images based on the vehicle classification, wherein the features include a truck trailer, vehicle damage, a logo, a number of axles, a number of wheels, or running lights;
   comparing the features with risk indicators to determine estimation of the risk; and
   providing, using the processor, instructions for an action based on the risk.

2. The computer-implemented method according to claim 1, wherein the extracting the features based on the vehicle classification includes extracting the features based on the vehicle classification being a classification of interest.

3. The computer-implemented method according to claim 1, wherein the performing the image-based estimation is of the risk of the vehicle having a weight over a predetermined threshold.

4. The computer-implemented method according to claim 3, wherein the receiving the images includes receiving at least a front view, a rear view, and a side view of each of the sides of the vehicle.

5. The computer-implemented method according to claim 3, wherein the extracting the features based on the vehicle classification includes extracting the features based on the vehicle being classified as a truck.

6. The computer-implemented method according to claim 3, wherein the extracting the features from the one or more vehicle images includes extracting a license plate.

7. The computer-implemented method according to claim 3, wherein the providing the instructions based on the risk includes indicating that the vehicle must stop at a weighing station.

8. The computer-implemented method according to claim 1, further comprising storing the risk indicators based on the specified status, wherein the comparing the features with the risk indicators includes assigning a value to the estimation of the risk based on a result of the comparing.

9. A system to perform image-based estimation of a risk of a vehicle having a specified status, the system comprising:
   a memory device configured to store risk indicators associated with the specified status; and
   a processor configured to receive images from one or more cameras, obtain one or more vehicle images of the vehicle from the image, classify the vehicle based on the one or more vehicle images to determine a vehicle classification, extract features from the one or more vehicle images based on the vehicle classification, compare the features with the risk indicators to determine estimation of the risk, and provide instructions for an action based on the risk, wherein the features include a truck trailer, vehicle damage, a logo, a number of axles, a number of wheels, or running lights.

10. The system according to claim 9, wherein the specified status is an overweight vehicle with a weight over a predetermined threshold.

11. The system according to claim 10, wherein the processor receives the one or more vehicle images including at least a front view, a rear view, and a side view of each of the sides of the vehicle.

12. The system according to claim 10, wherein the processor extracts the features based on the vehicle being classified as a truck.

13. The system according to claim 10, wherein the processor extracts a license plate from the one or more vehicle images.

14. The system according to claim 10, wherein the processor indicates that the vehicle must stop at a weighing station based on the risk.

15. The system according to claim 9, wherein the processor assigns a value to the estimation of the risk based on a result of comparing the features with the risk indicators.

16. A computer program product for performing image-based estimation of a risk of a vehicle having a specified status, the computer program product comprising a computer readable storage medium having program instructions embodied therewith, the program instructions executable by a processor to perform a method comprising:
   receiving images from one or more cameras;
   obtaining one or more vehicle images of the vehicle from the image;
   classifying the vehicle based on the one or more vehicle images to determine a vehicle classification;
   extracting features from the one or more vehicle images based on the vehicle classification, wherein the features include a truck trailer, vehicle damage, a logo, a number of axles, a number of wheels, or running lights;
   comparing the features with risk indicators to determine estimation of the risk; and
   providing instructions for an action based on the risk.

17. The computer program product according to claim 16, wherein the performing the image-based estimation is of the risk of the vehicle having a weight over a predetermined threshold.

18. The computer program product according to claim 17, wherein the receiving the images includes receiving at least a front view, a rear view, and a side view of each of the sides of the vehicle, and the extracting the features based on the vehicle classification includes extracting the features based on the vehicle being classified as a truck.

19. The computer program product according to claim 17, wherein the extracting the features from the one or more vehicle images includes extracting a license plate, and the providing the instructions based on the risk includes indicating that the vehicle must stop at a weighing station.

20. The computer program product according to claim 16, further comprising storing the risk indicators based on the specified status, wherein the comparing the features with the risk indicators includes assigning a value to the estimation of the risk based on a result of the comparing.

* * * * *